C. MAEURER.
Filter.
No. 212,023.　　　Patented Feb. 4, 1879.
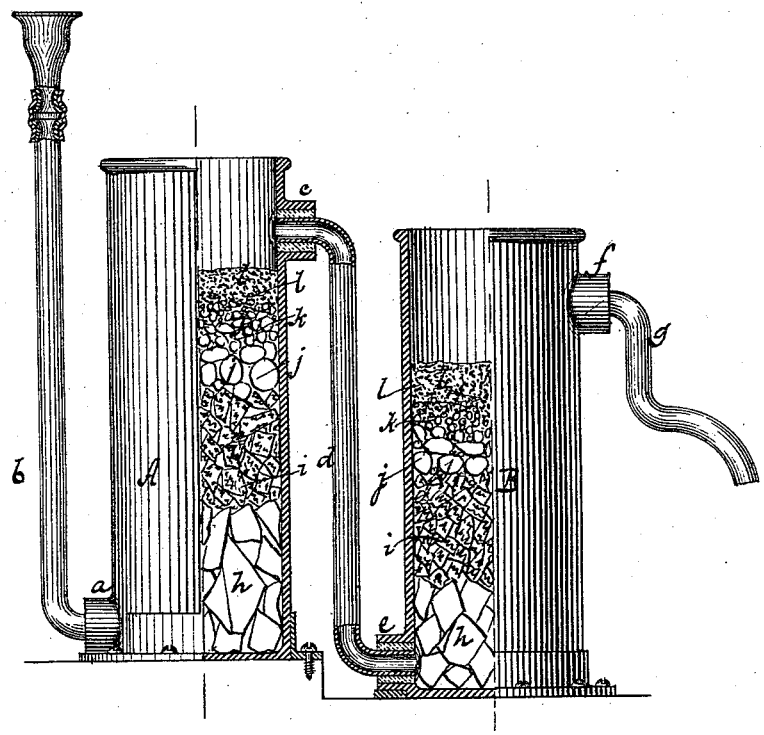
Witnesses
Otto Stupeland
Wm Mullen
Inventor
Christian Maeurer
by
Van Santvoord & Hauff
his attys.

UNITED STATES PATENT OFFICE.

CHRISTIAN MAEURER, OF BROOKLYN, NEW YORK.

IMPROVEMENT IN FILTERS.

Specification forming part of Letters Patent No. 212,023, dated February 4, 1879; application filed December 28, 1878.

*To all whom it may concern:*

Be it known that I, CHRISTIAN MAEURER, of Brooklyn, in the county of Kings and State of New York, have invented a new and useful Improvement in Filters, which improvement is fully set forth in the following specification, reference being had to the accompanying drawing, which represents a sectional side elevation.

This invention consists in the combination, in a filter, of two or more filtering-vessels, each of which is provided with a bottom layer of quartz and succeeding layers of charcoal, coarse gravel, fine gravel, and sand; a supply-pipe, which is detachably connected to a nipple near the bottom of the first filtering-vessel; a connecting-pipe, which extends from a nipple near the top of the first vessel to a nipple near the bottom of the second vessel, and is detachably connected to both these nipples; and a discharge-pipe, which is connected to a nipple near the top of the second vessel, so that water introduced through the supply-pipe is brought in contact successively with the layer of quartz, then with that of charcoal, then with those of coarse and fine gravel, and, finally, with that of sand in the first filtering-vessel, and thence in the same order with the several layers of quartz, charcoal, coarse gravel, fine gravel, and sand in the second filtering-vessel, and thereby the water is deprived of its impurities, and by detaching the supply-pipe and the connecting-pipe a current of clean water can be passed through each filtering-vessel in a reverse direction, for the purpose of washing out the filtering material.

In the example shown in the drawing the letters A B designate, respectively, the first and second filtering-vessels which compose my filter.

If desired, however, one or more additional filtering-vessels may be added.

The first filtering-vessel, A, is provided with a nipple, *a*, near its bottom, and in this nipple is secured the supply-pipe *b*, the connection between said pipe and nipple being such that the pipe can be readily detached and attached as may be required.

Near the top of the filtering-vessel A, and on the side opposite to the nipple *a*, is provided a second nipple, *c*, which connects by means of a pipe, *d*, with a nipple, *e*, near the bottom of the second filtering-vessel, B, the connections between this pipe and nipples *c* and *e* being such that said pipe can be readily detached or attached.

Near the top of the second filtering-vessel, and on its side opposite to the nipple *e*, is another nipple, *f*, in which is secured the discharge-pipe *g*.

When the filtering materials in the several filtering-vessels have become charged with impurities, I disconnect the supply-pipe from the nipple *a* of the first filtering-vessel and the connecting-pipe *d* from the nipple *e* of the second filtering-vessel, and then I pass a current of clear water through each filtering-vessel in a reverse direction, so as to wash out the impurities from the filtering material and render the same again fit for use.

If desired, the discharge-pipe *g* may be connected to a coil situated in a vessel filled with ice, so that the water flowing from said discharge-pipe will be cooled to the desired temperature.

By using the various layers of filtering material, as above described, I have succeeded in cleaning very impure water, and in order to remove all objectionable impurities I have found it necessary to combine at least two filtering-vessels in the manner shown.

What I claim as new, and desire to secure by Letters Patent, is—

The combination, in a filter, of two or more filtering-vessels, each of which is provided with a bottom layer of quartz and succeeding layers of charcoal, coarse gravel, fine gravel, and sand, a supply-pipe, which is detachably connected to a nipple near the bottom of the first filtering-vessel, a connecting-pipe, which extends from a nipple near the top of the first vessel to a nipple near the bottom of the second vessel and is detachably connected to both these nipples, and a discharge-pipe, which is connected to a nipple near the top of the second vessel, all as and for the purpose herein shown and described.

In testimony that I claim the foregoing I have hereunto set my hand and seal this 26th day of December, 1878.

CHRISTIAN MAEURER. [L. S.]

Witnesses:
E. F. KASTENHUBER,
J. VAN SANTVOORD.